(12) United States Patent
Heath (10) Patent No.: US 12,472,614 B2
(45) Date of Patent: Nov. 18, 2025

(54) POWER TOOL FOR INSTALLING DROP-IN ANCHORS

(71) Applicant: MILWAUKEE ELECTRIC TOOL CORPORATION, Brookfield, WI (US)

(72) Inventor: Peter R. Heath, Wauwatosa, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 63 days.

(21) Appl. No.: 18/568,897

(22) PCT Filed: Jun. 10, 2022

(86) PCT No.: PCT/US2022/032995
§ 371 (c)(1),
(2) Date: Dec. 11, 2023

(87) PCT Pub. No.: WO2022/265927
PCT Pub. Date: Dec. 22, 2022

(65) Prior Publication Data
US 2024/0286261 A1  Aug. 29, 2024

Related U.S. Application Data

(60) Provisional application No. 63/210,229, filed on Jun. 14, 2021.

(51) Int. Cl.
*B25D 17/06*  (2006.01)
(52) U.S. Cl.
CPC .................. *B25D 17/06* (2013.01)
(58) Field of Classification Search
CPC ....................................................... B25D 17/06
(Continued)

(56) References Cited

U.S. PATENT DOCUMENTS

| 4,265,008 A | 5/1981 | Lippacher et al. |
| 4,828,445 A | 5/1989 | Giannuzzi |

(Continued)

FOREIGN PATENT DOCUMENTS

| CN | 210616411 U | 5/2020 |
| EP | 0426918 A1 | 5/1991 |

(Continued)

OTHER PUBLICATIONS

International Search Report and Written Opinion for Application No. PCT/US2022/032995 dated Oct. 7, 2022 (12 pages).

*Primary Examiner* — Praachi M Pathak
(74) *Attorney, Agent, or Firm* — Michael Best & Friedrich LLP (57) ABSTRACT

A power tool includes a housing, a motor positioned within the housing, a drive assembly at least partially positioned within the housing and coupled to the motor, and a drive pin assembly supported by the housing. The drive pin assembly includes a drive pin body extending from the housing, a drive pin configured to be inserted into a drop-in anchor and coupled to the drive assembly for movement relative to the drive pin body between a retracted position and an extended position, and a threaded die supported by the drive pin body and configured to be inserted into the drop-in anchor with the drive pin. The threaded die is configured to be movable radially outward by the drive pin as the drive pin moves from the retracted position toward the extended position.

15 Claims, 7 Drawing Sheets

(58) Field of Classification Search
USPC .......................................................... 173/48
See application file for complete search history.

(56) References Cited

U.S. PATENT DOCUMENTS

| | | | |
|---|---|---|---|
| 4,890,779 | A | 1/1990 | Giannuzzi |
| 4,963,062 | A | 10/1990 | Giannuzzi |
| 5,050,286 | A | 9/1991 | Miyanaga |
| 5,979,913 | A | 11/1999 | Kosik et al. |
| 6,490,773 | B1 | 12/2002 | Estes et al. |
| 6,553,640 | B1 | 4/2003 | Estes et al. |
| 6,585,456 | B2 | 7/2003 | Forse |
| 6,915,936 | B2 | 7/2005 | Estes |
| 7,065,855 | B2 | 6/2006 | Janusz |
| 7,752,944 | B2 | 7/2010 | Wallek |
| 7,814,631 | B2 | 10/2010 | Wallek |
| 8,037,789 | B2 | 10/2011 | Tanger |
| 8,061,000 | B2 | 11/2011 | Santamarina et al. |
| 8,166,624 | B2 | 5/2012 | Andreasen et al. |
| 8,230,767 | B2 | 7/2012 | Frommelt et al. |
| 8,231,636 | B2 | 7/2012 | Fitzpatrick et al. |
| 8,398,346 | B2 | 3/2013 | Bland et al. |
| 8,424,180 | B2 | 4/2013 | Wallek |
| 8,439,614 | B2 | 5/2013 | Bland et al. |
| 8,465,239 | B2 | 6/2013 | Armiento et al. |
| 8,499,427 | B2 | 8/2013 | Wallek |
| 8,534,527 | B2 | 9/2013 | Brendel et al. |
| 8,540,469 | B2 | 9/2013 | Armiento et al. |
| 8,602,285 | B2 | 12/2013 | Santamarina et al. |
| 8,992,147 | B2 | 3/2015 | Armiento et al. |
| 9,222,359 | B2 | 12/2015 | Ginter |
| 9,233,458 | B2 | 1/2016 | Schmidt et al. |
| 9,296,050 | B2 | 3/2016 | Cousineau |
| 9,592,592 | B2 | 3/2017 | Prunean |
| 9,624,770 | B2 | 4/2017 | Cousineau |
| 9,844,866 | B2 | 12/2017 | Langdon, Jr. |
| 9,970,467 | B2 * | 5/2018 | Dijkhuis ................ F16B 13/065 |
| 9,975,232 | B2 | 5/2018 | Neitzell et al. |
| 10,272,555 | B2 | 4/2019 | Langdon, Jr. |
| 10,300,588 | B2 | 5/2019 | Pauba |
| 10,323,671 | B2 | 6/2019 | Prunean |
| 10,537,982 | B2 | 1/2020 | Prunean |
| 2010/0222785 | A1 | 9/2010 | Fitzpatrick et al. |
| 2010/0299844 | A1 | 12/2010 | Armiento et al. |
| 2012/0241490 | A1 * | 9/2012 | Busch ................... A01K 11/002 |
| | | | 227/76 |
| 2013/0266388 | A1 | 10/2013 | Santamarina et al. |
| 2014/0262398 | A1 | 9/2014 | Gehret et al. |
| 2015/0290722 | A1 | 10/2015 | Foser |
| 2018/0147707 | A1 * | 5/2018 | Pauba .................. F16B 19/1081 |
| 2018/0250801 | A1 | 9/2018 | Foser et al. |
| 2019/0030701 | A1 * | 1/2019 | Duggan ................ B25D 16/006 |
| 2019/0032693 | A1 | 1/2019 | Holub et al. |
| 2019/0170175 | A1 | 6/2019 | Cousineau |
| 2019/0275653 | A1 | 9/2019 | Nguyen et al. |
| 2019/0277322 | A1 * | 9/2019 | Pauba ................... F16B 13/063 |
| 2020/0147766 | A1 | 5/2020 | Prunean |

FOREIGN PATENT DOCUMENTS

| | | |
|---|---|---|
| EP | 1982797 A2 | 10/2008 |
| EP | 2395247 A1 | 12/2011 |
| EP | 3360634 A1 | 8/2018 |
| WO | 2013107438 A2 | 7/2013 |
| WO | 2018002118 A1 | 1/2018 |
| WO | 2019007726 A1 | 1/2019 |
| WO | 2019162058 A1 | 8/2019 |

* cited by examiner

POWER TOOL FOR INSTALLING DROP-IN ANCHORS

CROSS-REFERENCE TO RELATED APPLICATIONS

This application is a national stage filing under 35 U.S.C. § 371 of International Application No. PCT/US2022/032995 filed Jun. 10, 2022, which claims priority to U.S. Provisional Application No. 63/210,229, filed Jun. 14, 2021, the entire contents of each of which are incorporated by reference herein.

FIELD OF THE INVENTION

The present invention relates to power tools, and more particularly to power tools for installing drop-in anchors.

BACKGROUND OF THE INVENTION

Drop-in anchors are typically used for anchoring objects in concrete. Usually, the anchors are dropped into a pre-drilled hole within the concrete and require the use of a setting tool and a hammer to repeatedly strike the setting tool to expand and set the anchor within the hole in the concrete. However, some anchors are installed overhead and the repeated striking of the setting tool with a hammer can cause a great deal of fatigue on the users.

SUMMARY OF THE INVENTION

The present invention provides, in one aspect, a power tool for installing a drop-in anchor. The power tool includes a housing, a motor positioned within the housing, a drive assembly at least partially positioned within the housing and coupled to the motor, and a drive pin assembly supported by the housing. The drive pin assembly includes a drive pin body extending from the housing, a drive pin configured to be inserted into the drop-in anchor and coupled to the drive assembly for movement relative to the drive pin body between a retracted position and an extended position, and a threaded die supported by the drive pin body and configured to be inserted into the drop-in anchor with the drive pin. The threaded die is configured to be movable radially outward by the drive pin as the drive pin moves from the retracted position toward the extended position.

In some aspects, the drive pin assembly further includes a biasing member that biases the drive pin into the retracted position.

In some aspects, the biasing member is a coil spring.

In some aspects, the power tool further includes a clevis coupled to the housing for mounting the drive pin assembly to the housing and a tool release mechanism configured to selectively release the drive pin assembly from the clevis. In some aspects, the tool release mechanism includes a shaft, a knob coupled to an end of the shaft, and an end cap threadably coupled an end of the shaft opposite the knob.

In some aspects, the drive pin assembly further includes a drive pin carrier that engages the drive assembly such that the drive assembly moves the drive pin carrier, and wherein the drive pin is coupled to and extends from the drive pin carrier.

In some aspects, the drive pin assembly further includes a front plate coupled to an end of the drive pin body, and the front plate defines an opening through which the drive pin and the threaded die extend.

In some aspects, the drive pin assembly further includes a gasket positioned on the front plate around the opening.

In some aspects, the gasket is a rubber gasket that is configured to absorb axial forces and allow axial movement between the anchor and the power tool.

In some aspects, the threaded die is removable from the drive pin assembly to allow attachment of different sized threaded dies.

In some aspects, the drive pin assembly further includes a spring that biases the threaded die toward the drive pin.

In some aspects, the drive pin includes a ramped portion that forces the threaded die to move radially outward as the drive pin moves from the retracted position toward the extended position.

In some aspects, the drive pin assembly further comprises a second threaded die supported by the drive pin body and configured to be inserted into the drop-in anchor with the drive pin. The second threaded die is movable radially outward by the drive pin as the drive pin moves from the retracted position toward the extended position.

In some aspects, the power tool further includes a manually-operable actuator for selectively operating the motor and a battery receptacle for selectively receiving a battery pack for providing electrical power to the motor.

In some aspects, the drive assembly includes a cylinder, an extendible piston disposed within the cylinder, and a pump configured to provide a pressurized hydraulic fluid to the cylinder and extend the piston from the cylinder.

The present invention provides, in another aspect, a drive pin assembly for use with a power tool to install a drop-in anchor. The drive pin assembly includes a drive pin body and a drive pin disposed within the drive pin body and configured to be inserted into the drop-in anchor. The drive pin is moveable relative to the drive pin body between a retracted position and an extended position. A threaded die is supported by the drive pin body and configured to be inserted into the drop-in anchor with the drive pin. The threaded die is movable radially outward by the drive pin as the drive pin moves from the retracted position toward the extended position.

In some aspects, the drive pin assembly further includes a tool release mechanism configured to selectively couple the drive pin assembly to the power tool.

In some aspects, the drive pin includes a ramped portion that forces the threaded die to move radially outward as the drive pin moves from the retracted position toward the extended position.

In some aspects, the drive pin assembly further includes a front plate coupled to an end of the drive pin body and a gasket positioned on the front plate and configured to contact the drop-in anchor during a setting operation.

The present invention provides, in yet another aspect, a power tool for installing a drop-in anchor. The power tool includes a housing, a motor positioned within the housing, a drive assembly at least partially positioned within the housing and coupled to the motor, and a drive pin assembly supported by the housing. The drive pin assembly includes a drive pin body extending from the housing, a drive pin configured to be inserted into the drop-in anchor and coupled to the drive assembly for movement relative to the drive pin body between a retracted position and an extended position, a front plate coupled to an end of the drive pin body, and a gasket positioned on the front plate and configured to contact the drop-in anchor during a setting operation.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
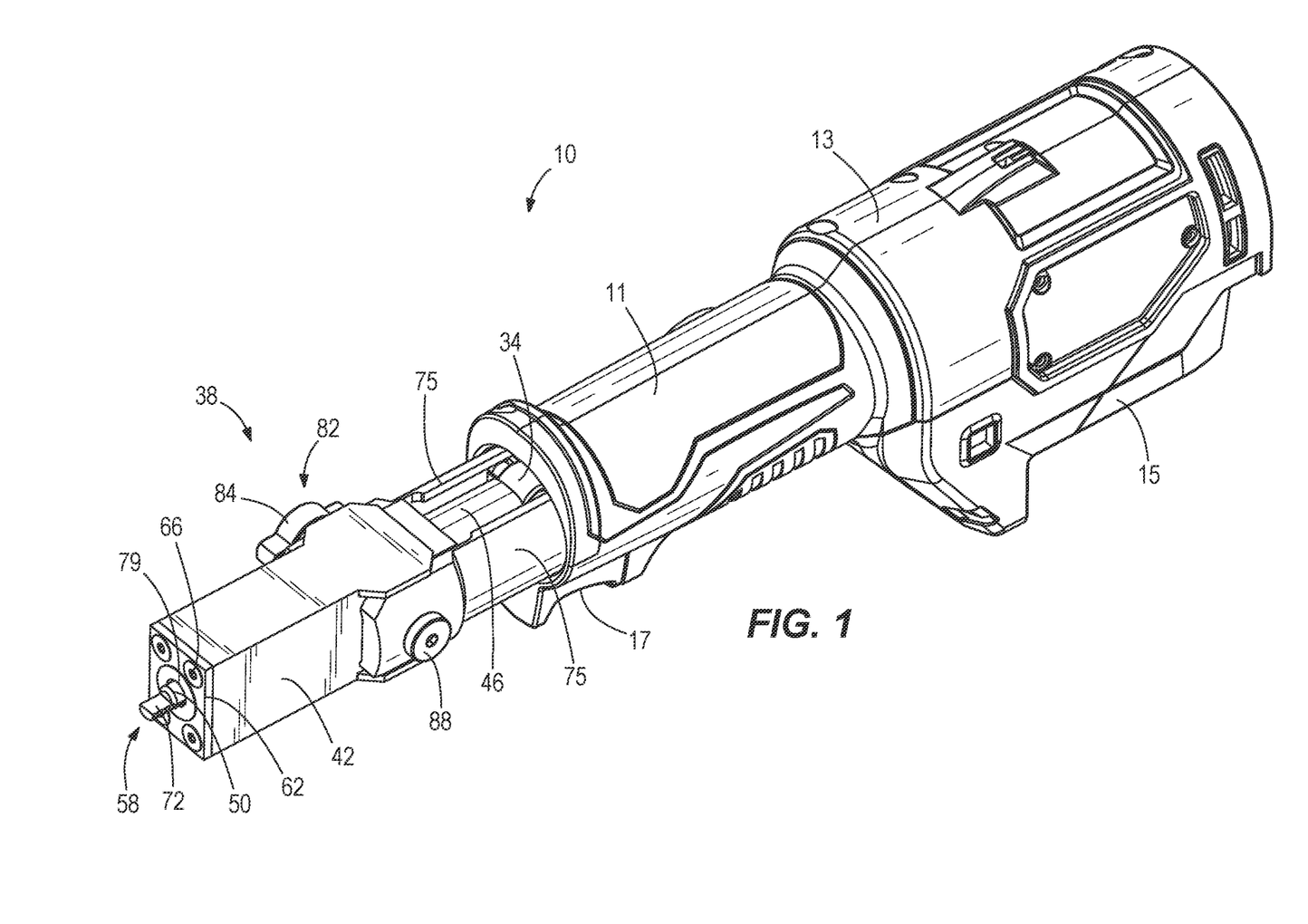
FIG. 1 is a perspective view of a power tool in accordance with an embodiment of the invention.
Figure 7:
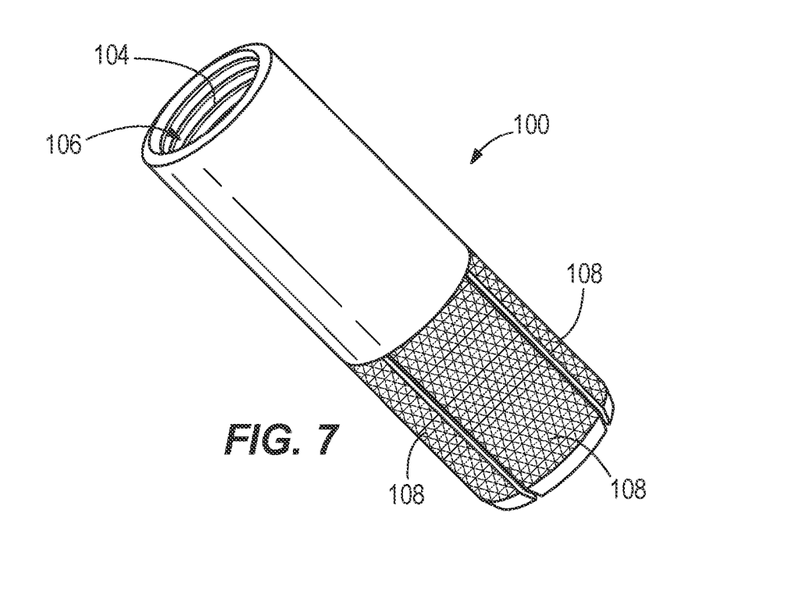
FIG. 7 is a perspective view of a drop-in anchor.

FIG. 1 illustrates a power tool 10 for installing a drop-in anchor 100 (FIG. 7). The power tool 10 includes a drive pin assembly 38 that is operable to set (e.g., expand) an anchor positioned in a pre-drilled hole. In the illustrated embodiment, the power tool 10 is a hydraulic power tool, such as a hydraulic pressing tool. In other embodiments, the power tool 10 may take the form of other types of power tools, such as a drill or reciprocating saw, operable to impart motion to the drive pin assembly 38. In still other embodiments, the power tool 10 may be a dedicated power tool for imparting motion to the drive pin assembly 38.

Figure 2:
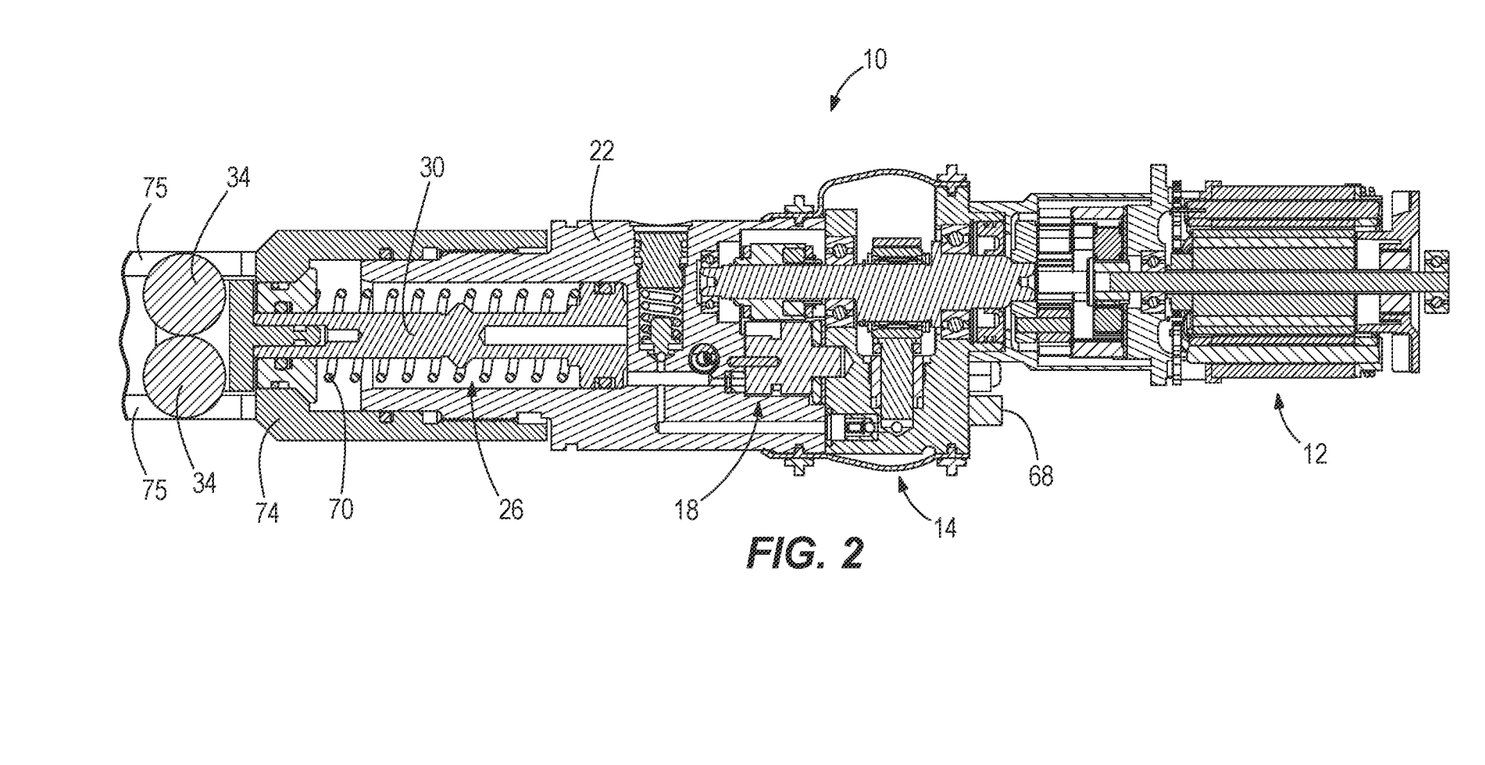
FIG. 2 is a cross-sectional view of a portion of the power tool of FIG. 1, illustrating a drive assembly of the power tool.

The illustrated power tool 10 includes a housing having a grip portion 11, a motor portion 13 extending rearward from the grip portion 11, and a battery receptacle 15 disposed on the motor portion 13. As shown in FIG. 2, a drive assembly 18 is at least partially positioned within the grip portion 11, and a motor 12 is positioned within the motor portion 13. The motor 12 is coupled to the drive assembly 18 to selectively drive the drive assembly 18. The battery receptacle 15 is configured to removably receive a battery pack, such as a rechargeable power tool battery pack. The battery pack selectively provides electrical power to the motor 12 to energize the motor 12. In other embodiments, the power tool 10 may be a corded power tool, and the battery receptacle 15 may be omitted. The power tool 10 also includes an actuator 17 for selectively connecting the battery pack to the motor 12 and, thereby, actuating the tool 10. In the illustrated embodiment, the actuator 17 is a trigger located on the grip portion 11 of the housing. In other embodiments, the actuator 17 may be a different type of mechanism, such as a button, switch, or dial. Additionally, the actuator 17 may be located elsewhere on the housing.

With continued reference to FIG. 2, the drive assembly 18 is a hydraulic drive assembly including a pump 14 driven by the motor 12, a cylinder housing 22 defining a cylinder 26 therein, and an extensible piston 30 with a piston spring 70 disposed within the cylinder 26. The pump 14 provides pressurized hydraulic fluid to the cylinder 26, causing the piston 30 to extend from the housing 22 and thereby actuate a plurality of actuators 34. The actuators 34 move linearly to output linear motion to the drive pin assembly 38 during operation of the power tool 10. In other embodiments, the drive assembly 18 may include a non-hydraulic mechanism to output motion to the drive assembly 38. For example, the drive assembly 18 may include a gear train and/or planetary gear arrangement to output rotary motion to the drive pin assembly 38. Alternatively, the drive assembly 18 may include a scotch-yoke-type mechanism to output linear motion to the drive pin assembly 38.

The illustrated power tool 10 further includes a clevis 74 coupled to the housing. The clevis 74 has a plurality of support rods 75 extending from the grip portion 11 of the housing. The support rods 75 mount the drive pin assembly 38 to the housing. In the illustrated embodiment, the power tool 10 also includes a tool release mechanism 82 configured to selectively release the drive pin assembly 38 from the support rods 75. In other embodiments, the drive pin assembly 38 may be permanently coupled to the housing.

Figure 3:
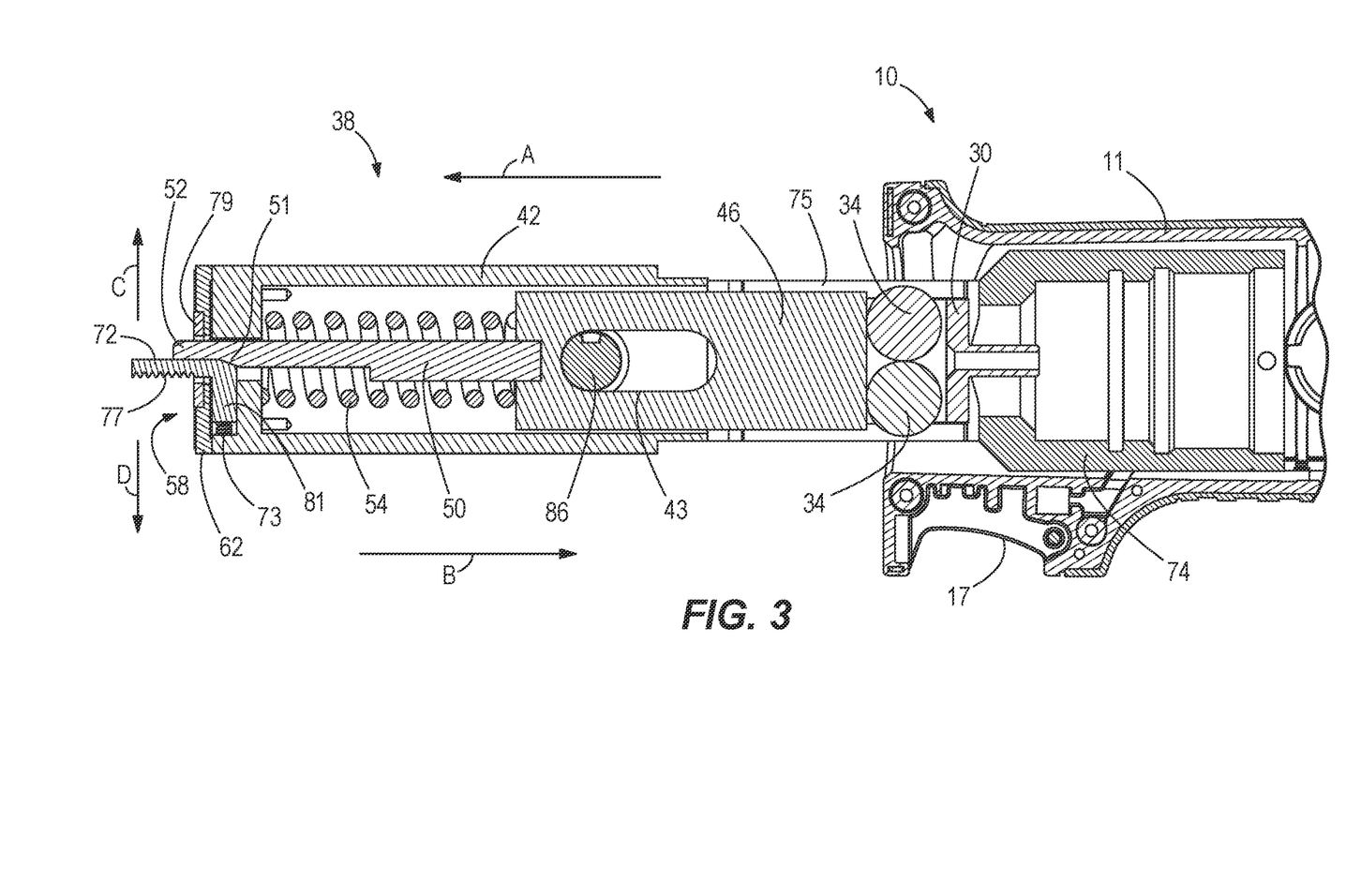
FIG. 3 is a cross-sectional view of another portion of the power tool of FIG. 1, illustrating a drive pin assembly of the power tool.
Figure 4:
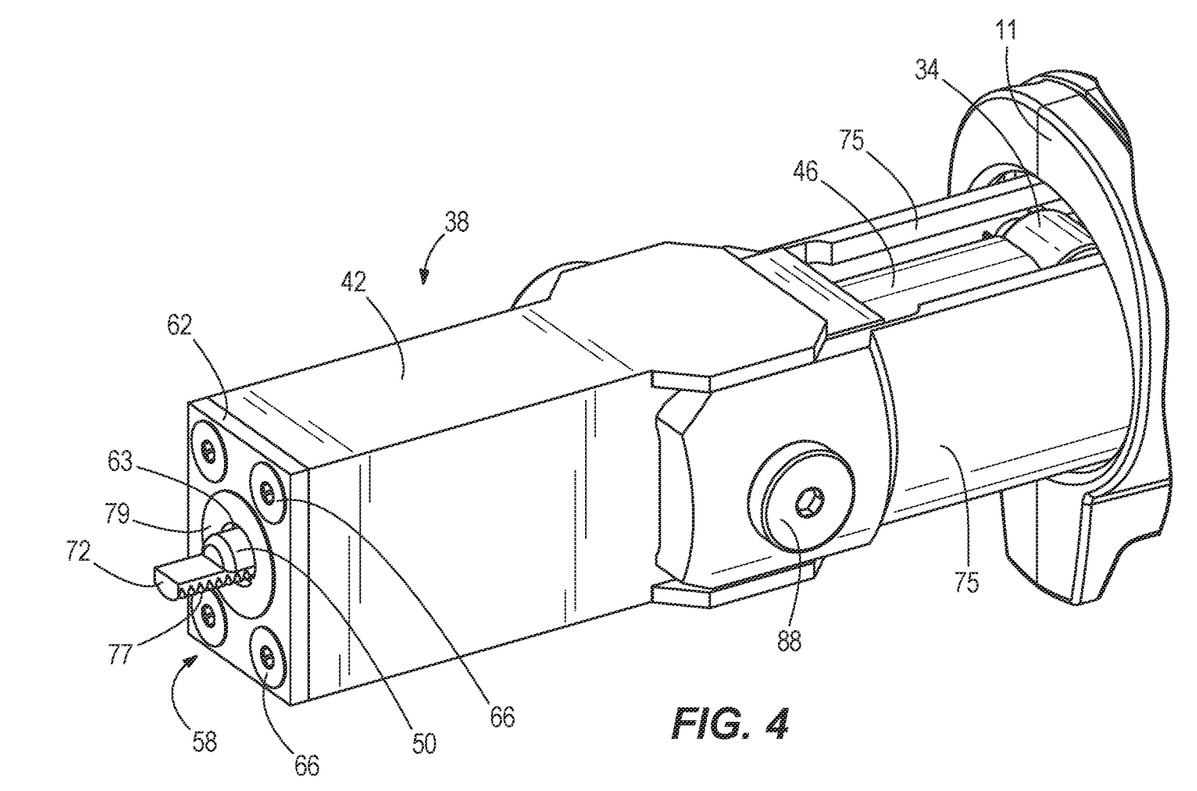
FIG. 4 is an enlarged perspective view of the drive pin assembly of FIG. 3.

With reference to FIGS. 1, 3, and 4, the drive pin assembly 38 includes a drive pin body 42, a drive pin carrier 46, a drive pin 50, and a return spring 54. The drive pin body 42 is coupled to and extends from the clevis 74. The drive pin body 42 supports the other components of the drive pin assembly 38. The drive pin carrier 46 is positioned at least partially within the drive pin body 42. The drive pin carrier 46 engages the actuators 34 such that the actuators 34 move (e.g., push) the drive pin carrier 46 in the direction of arrow A. The drive pin carrier 46 also defines an aperture 43 that receives part of the tool release mechanism 82. The drive pin 50 is coupled to and extends from the drive pin carrier 46 such that the drive pin 50 moves with the drive pin carrier 46. In particular, the drive pin 50 moves relative to the drive pin body 42 between a retracted position (FIG. 3) and an extended position. In the retracted position, the actuators 34 do not push the drive pin carrier 46, and the drive pin 50 is mostly received in the drive pin body 42. In the extended position, the actuators 34 push the drive pin carrier 46 in the direction of arrow A so that a significant portion of the drive pin 50 extends out of the drive pin body 42. A distal end 52 of the drive pin 50 opposite from the drive pin carrier 46 is configured to be inserted into an anchor. The drive pin 50 also defines a ramped portion 51 between the distal end 52 and a remainder of the drive pin 50. The return spring 54 is configured to bias the drive pin carrier 46, and thereby the drive pin 50, toward the actuators 34 in the direction of arrow B. That is, the return spring 54 pushes the drive pin carrier 46 and the drive pin 50 back to the retracted position when the actuators 34 are not applying a force to the drive pin carrier 46. In the illustrated embodiment, the return spring 54 is a coil spring wrapped around the drive pin 50 and positioned between an inner surface of the drive pin body 42 and an end surface of the drive pin carrier 46. In other embodiments, the return spring 54 may be a different type of biasing member. In some embodiments, the return spring 54 may be omitted, and the actuators 34 (or other drive elements) may move the drive pin 50 in both the direction of arrow A and the direction of arrow B.

The drive pin assembly 38 further includes a threaded die assembly 58. The illustrated threaded die assembly 58 has a front plate 62, a threaded die 72, and an alignment spring 73. The front plate 62 is coupled to an end of the drive pin body 42 opposite the housing and defines an opening 63 through with the drive pin 50 and the threaded die 72 extend. In the illustrated embodiment, the front plate 62 is removably coupled to the drive pin body 42 by one or more fasteners 66 (e.g., screws). In other embodiments, the front plate 62 may be permanently secured to the drive pin body 42. The threaded die 72 includes a leg portion 81 positioned within the drive pin body 42 behind the front plate 62, and a threaded portion 77 extending out of the drive pin body 42 through the opening 63. The threaded portion 77 is configured to be inserted into an anchor with the drive pin 50. In the illustrated embodiment, the threaded portion 77 includes a flat surface that contacts the drive pin 50 and a curved surface facing outwardly away from the drive pin 50. The curved surface includes a plurality of threads configured to engage or grip an inner surface of the anchor. The alignment spring 73 biases the threaded die toward the drive pin 50 in the direction of arrow C. In the illustrated embodiment, the alignment spring 73 is a coil spring positioned between an inner surface of the drive pin body 42 and the leg portion 81 of the threaded die 72. In other embodiments, the alignment spring 73 may be a different type of biasing member.

In some embodiments, such as the illustrated embodiment, the threaded die assembly 58 also includes a gasket 79 positioned on the front plate 62 around the opening 63. The gasket 79 may be, for example, an elastomeric or rubber gasket. The gasket 79 can be configured to absorb the axial forces from the anchor 100 if the anchor 100 is pulled up toward the power tool 10. In addition, the gasket 79 provides a relatively soft surface that contacts the anchor 100 when the anchor 100 is engaged by the power tool 10. The gasket 79 helps the threads on the threaded die 72 properly align with internal threads on the anchor 100 by allowing some axial movement between the anchor 100 and threaded die assembly, as opposed to the hard outer surface of the front plate 62.

The thread die assembly 58 is sized according to an internal diameter of a threaded portion 104 on the drop-in anchor 100. Depending on the size of the anchor 100 the user is inserting into a workpiece (e.g., a concrete slab), the threaded die assembly 58 might need to be changed. To change out the threaded die assembly 58, the user removes all of the fasteners 66, which allows the user to remove the front plate 62 and the threaded die 72. Then, the user installs a different size threaded die assembly 58 and secures the front plate 62 back onto the drive pin body 42 with the fasteners 66. In some embodiments, the drive pin 50 and the drive pin carrier 46 may also be replaced to correspond with the different size threaded die assembly 58.

With continued reference to FIGS. 1, 3, and 4, to install the drop-in anchor 100 (FIG. 7) into a workpiece, a user first drills a hole in the workpiece and inserts the anchor 100 in the hole. Next, the user positions the power tool 10 over the anchor 100 such that the threaded die assembly 58 is located above a bore 106 in the anchor 100. Then, the user inserts the thread die 72 into the bore 106 and actuates the actuator 17, causing the piston 30 to start extending from the piston housing 22. As the piston 30 continuously extends from the housing 22, the actuators 34 drive (e.g., push) the drive pin carrier 46 and the drive pin 50 in the direction of arrow A and toward the extended position against the bias of the return spring 54 and the piston spring 70. As the drive pin 50 moves from the retracted position to the extended position, the thread die 72 remains stationary until the ramped portion 51 of the drive pin 50 rides over the thread die 72 and forces the threaded die 72 to move radially outward in the direction of arrow D. As the threaded die 72 moves radially outward, the threaded portion 77 of the threaded die 72 contacts the internal threads of the threaded portion 104 of the anchor 100 in order to latch the threaded die 72 onto the anchor 100. The gasket 79 allows some movement or "give" between the threaded die 72 and the anchor 100 to help align the threads. With the threaded die 72 latched to the threaded portion 104 of the anchor 100, the drive pin 50 continues to move forward until the drive pin 50 contacts an internal stud located in the bore 106 of the anchor 100. The internal stud is generally wedge-shaped such that when the drive pin 50 contacts and pushes the stud, the stud forces a plurality of expanders 108 of the anchor to move radially outward. As the expanders 108 move radially outward (i.e., expand), the expanders engage an inner surface of the hole to set and secure the anchor 100 in the workpiece.

Upon completion of a setting operation, the pressure in the cylinder 26 is released, allowing both the piston 30 and the drive pin carrier 46 to rebound under the bias of the springs 70, 54, respectively. As the drive pin carrier 46 rebounds, the drive pin 50 moves back to the retracted position in the direction of arrow B. In addition, the ramped portion 51 of the drive pin 50 slides past the threaded die 72, allowing the threaded die 72 to move radially inward in the direction of arrow C under the bias of the alignment spring 73. As the threaded die 72 moves radially inward, the threaded portion 77 of the threaded die 72 disengages the threaded portion 104 of the anchor 100 to allow the user to remove the threaded die 72 from the bore 106.

In some embodiments, the power tool 10 can include a pressure sensor 68 (FIG. 2) configured to measure the pressure within the cylinder 26. In such embodiments, a user can monitor or select a target pressure within the cylinder 26 during the setting operation and, subsequently, the pressing force or load of the drive pin 50 corresponding to a particular type of anchor 100 or thread die assembly 58. In other embodiments, the pressure sensor 68 can be monitored and/or controlled by a controller configured to electrically communicate with a wireless device (e.g., a cell phone).

Figure 5:
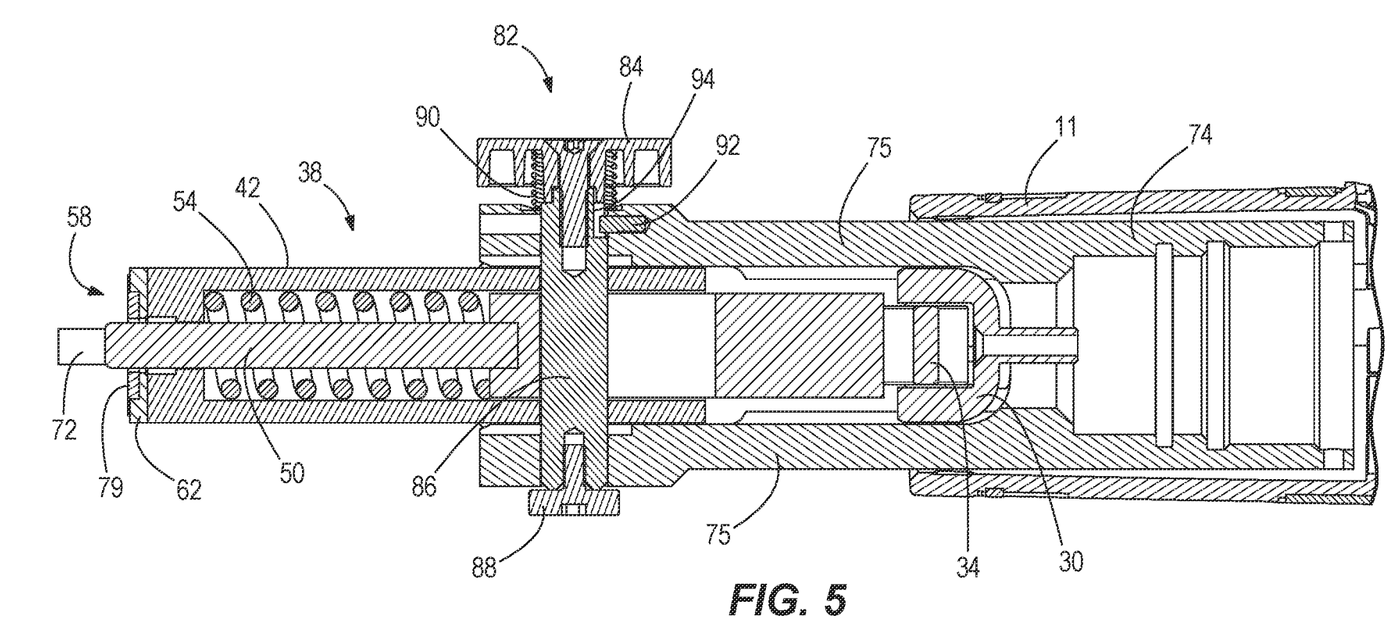
FIG. 5 is another cross-sectional view of the portion of the power tool shown in FIG. 3, illustrating a tool release mechanism.

FIG. 5 illustrates the tool release mechanism 82 used to selectively release the drive pin assembly 38 from the rest of the power tool 10. The illustrated tool release mechanism 82 includes a shaft 86, a knob 84, an end cap 88, and a spring 90. The shaft 86 extends through the aperture 43 (FIG. 3) of the drive pin carrier 46. The shaft 86 also helps support and guide the drive pin carrier 46 as the drive pin carrier 46 moves back-and-forth between the retracted and extended positions. The knob 84 is coupled to an end of the shaft 86. The knob 84 is secured to the shaft 86 such that actuation (e.g., rotation) of the knob 84 causes movement (e.g., rotation) of the shaft 86. The end cap 88 is coupled to an end of the shaft 86 opposite from the knob 84. The end cap 88 has a larger outer dimension (e.g., diameter) than the shaft 86 to inhibit the shaft 86 from being pulled through the aperture 43. In the illustrated embodiment, the end cap 88 is a screw or bolt threadably coupled to the shaft 86. The spring 90 is positioned between the knob 84 and one of the support rods 75 of the clevis 74 such that the tool release mechanism 82 does not rattle or shake during operation of the power tool 10. The tool release mechanism 82 further includes a post 92 mounted within one of the support rods 75, and an L-shaped keyway 94 formed on the shaft 86 for receiving the post 92.

When the end cap 88 is removed from the shaft 86, the post 92 inhibits the shaft 86 from falling out of the aperture 43 unless the post 92 follows the keyway 94.

To remove the drive pin assembly 38 from the power tool 10, the user depresses the knob 84 against the bias of the spring 90, and, while continually depressing the knob 84, the user turns the knob 84 a quarter turn (e.g., 90 degrees) clockwise, which allows the knob 84 to move slightly radially outward away from the support member 75 under the bias of the spring 90. Next, the user unthreads the end cap 88 from the shaft 86, which allows the user to pull the shaft 86 out of the aperture 43 and the support rods 75, and remove the drive pin assembly 38. In some scenarios, the end cap 88 may be uncoupled from the shaft 86 before the user depresses the knob 84 and turns the knob 84 a quarter turn.

Figure 6A:
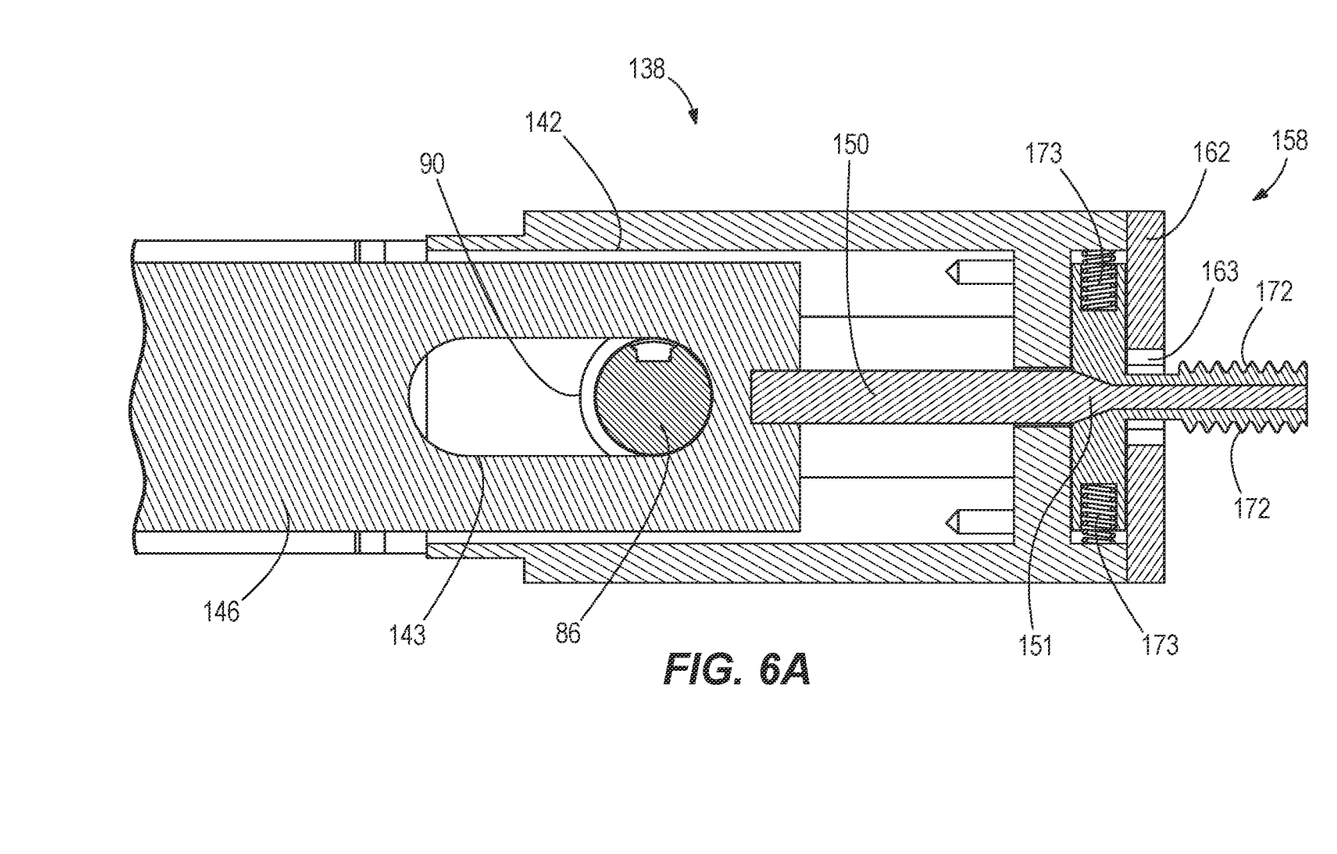
FIG. 6A is a cross-sectional view of an alternative embodiment of a drive pin assembly for use with the power tool of FIG. 1.
Figure 6B:
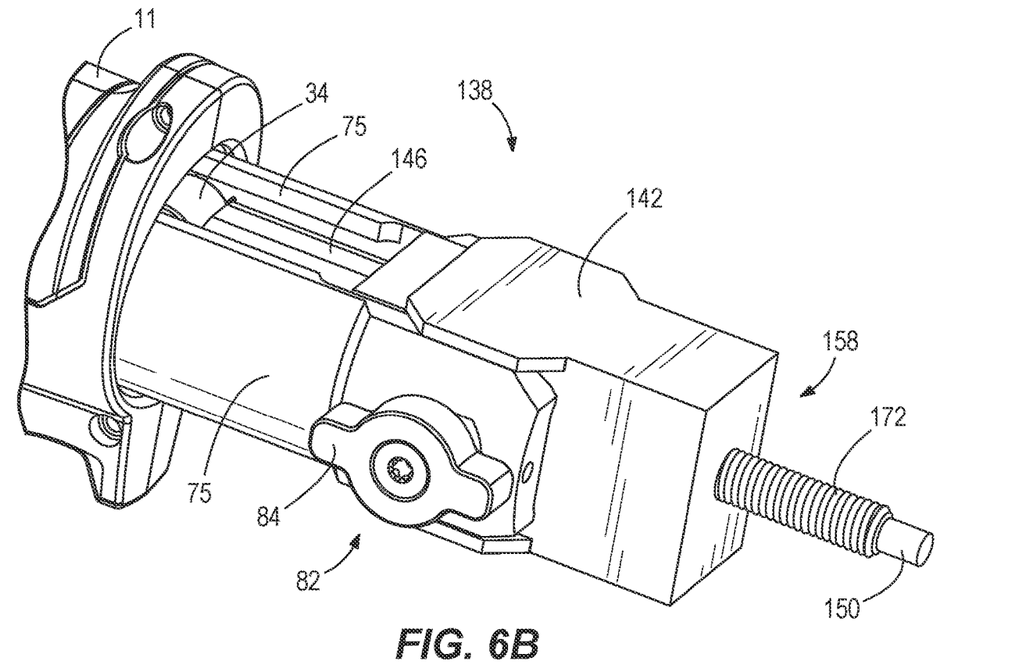
FIG. 6B is an enlarged perspective view of the drive pin assembly of FIG. 6A.

FIGS. 6A and 6B illustrate another drive pin assembly 138 for the power tool 10. The drive pin assembly 138 is similar to the drive pin assembly 38 of FIGS. 1-5, and like components and features have been given similar reference numbers plus 100. Differences between the drive pin assemblies 38, 138 are described below.

The drive pin assembly 138 includes a drive pin body 142, a drive pin carrier 146 positioned at least partially within the drive pin body 142, a drive pin 150 coupled to the drive pin carrier 146 for movement therewith, and a threaded die assembly 158 coupled to the drive pin body 142. The threaded die assembly 158 includes a front plate 162 having an opening 163. The threaded die assembly 158 also includes two threaded dies 172 received within the drive pin housing 142 extending through the opening 163. The threaded dies 172 are positioned on opposite sides of the drive pin 150. Each threaded die 172 is biased into engagement with the drive pin 150 by an alignment spring 173 located between an interior portion of the threaded die 172 and the drive pin body 142. When the drive pin 150 is moved from a retracted position to an extended position, a ramped portion 151 of the drive pin 150 pushes the threaded dies 172 radially outward and into engagement with the threaded portion 104 of the anchor 100 (FIG. 7), as compared with in the single threaded die 72 of the drive pin assembly 38. The added surface area of two threaded dies 172 can provide the user with a stronger contact between the drive pin assembly 158 and the anchor 100 during the setting operation.

In other embodiments of the power tool 10, the power tool 10 can be a standalone tool where the drive pin assembly 38, 138 is integrated with the rods 75 and clevis 74.

By using the power tool 10 to install and set drop-in anchors, users may be more efficient. Since some drop-in anchors are installed overhead, the power tool 10 eliminates the need to repeatedly strike a setting tool with a hammer above one's head to set the anchor 100, which reduces the rate of fatigue and injuries incurred by users. Furthermore, the drive pin assemblies 38, 138 may be adapted to any sized drop-in anchors by simply exchanging the thread die assemblies 58, 158. This modularity allows for quicker tool changes resulting in more time spent on the job, which improves overall worker and job site efficiency.

Although the invention has been described in detail with reference to certain preferred embodiments, variations and modifications exist within the scope and spirit of one or more independent aspects of the invention as described. Various features and advantages of the invention are set forth in the following claims.

What is claimed is:

1. A power tool for installing a drop-in anchor, the power tool comprising:
    a housing;
    a motor positioned within the housing;
    a drive assembly at least partially positioned within the housing and coupled to the motor; and
    a drive pin assembly supported by the housing, the drive pin assembly including
        a drive pin body extending from the housing,
        a drive pin configured to be inserted into the drop-in anchor, the drive pin coupled to the drive assembly for movement relative to the drive pin body between a retracted position and an extended position, and
        a threaded die supported by the drive pin body and configured to be inserted into the drop-in anchor with the drive pin, the threaded die movable radially outward by the drive pin as the drive pin moves from the retracted position toward the extended position.

2. The power tool of claim 1, wherein the drive pin assembly further includes a biasing member that biases the drive pin into the retracted position.

3. The power tool of claim 2, wherein the biasing member is a coil spring.

4. The power tool of claim 1, further comprising:
    a clevis coupled to the housing for mounting the drive pin assembly to the housing; and
    a tool release mechanism configured to selectively release the drive pin assembly from the clevis.

5. The power tool of claim 4, wherein the tool release mechanism includes a shaft, a knob coupled to an end of the shaft, and an end cap threadably coupled an end of the shaft opposite the knob.

6. The power tool of claim 1, wherein the drive pin assembly further includes a drive pin carrier that engages the drive assembly such that the drive assembly moves the drive pin carrier, and wherein the drive pin is coupled to and extends from the drive pin carrier.

7. The power tool of claim 1, wherein the drive pin assembly further includes a front plate coupled to an end of the drive pin body, the front plate defining an opening through which the drive pin and the threaded die extend.

8. The power tool of claim 7, wherein the drive pin assembly further comprises a gasket positioned on the front plate around the opening.

9. The power tool of claim 8, wherein the gasket is a rubber gasket that is configured to absorb axial forces and allow axial movement between the anchor and the power tool.

10. The power tool of claim 1, wherein the threaded die is removable from the drive pin assembly to allow attachment of different sized threaded dies.

11. The power tool of claim 1, wherein the drive pin assembly further comprises a spring that biases the threaded die toward the drive pin.

12. The power tool of claim 1, wherein the drive pin includes a ramped portion that forces the threaded die to move radially outward as the drive pin moves from the retracted position toward the extended position.

13. The power tool of claim 1, wherein the drive pin assembly further comprises a second threaded die supported by the drive pin body and configured to be inserted into the drop-in anchor with the drive pin, the second threaded die movable radially outward by the drive pin as the drive pin moves from the retracted position toward the extended position.

14. The power tool of claim 1, further comprising:
    a manually-operable actuator for selectively operating the motor; and a battery receptacle for selectively receiving a battery pack for providing electrical power to the motor.

15. The power tool of claim 1, wherein the drive assembly includes:
a cylinder;
an extendible piston disposed within the cylinder; and
a pump configured to provide a pressurized hydraulic fluid to the cylinder and extend the piston from the cylinder.

\* \* \* \* \*